(12) United States Patent
Guenther et al.

(10) Patent No.: US 8,292,513 B2
(45) Date of Patent: Oct. 23, 2012

(54) ROLLING BEARING COMPONENT, AND METHOD FOR THE PRODUCTION THEREOF

(75) Inventors: Doris Guenther, Nuremberg (DE); Carsten Merklein, Nuremberg (DE); Peter Schuster, Fuerth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 966 days.

(21) Appl. No.: 12/301,372

(22) PCT Filed: Apr. 12, 2007

(86) PCT No.: PCT/EP2007/053541
§ 371 (c)(1),
(2), (4) Date: Jan. 2, 2009

(87) PCT Pub. No.: WO2007/134913
PCT Pub. Date: Nov. 29, 2007

(65) Prior Publication Data
US 2009/0196542 A1    Aug. 6, 2009

(30) Foreign Application Priority Data
May 19, 2006   (DE) .......................... 10 2006 023 567

(51) Int. Cl.
*F16C 33/58* (2006.01)
*B05D 3/12* (2006.01)
*C23C 20/02* (2006.01)

(52) U.S. Cl. ...................... 384/569; 427/360; 427/421.1
(58) Field of Classification Search ................. 384/569; 29/898, 898.02, 898.03, 898.04, 898.041, 29/898.042, 898.066, 898.068, 898.069, 29/898.13; 427/421.1, 422, 425, 427, 427.1, 427/427.2, 427.3, 357, 360, 367
See application file for complete search history.

(56) References Cited

U.S. PATENT DOCUMENTS

| 3,372,054 A * | 3/1968 | Wishnie et al. | 427/455 |
| 8,016,490 B2 * | 9/2011 | Hosoya et al. | 384/531 |
| 2006/0228546 A1 * | 10/2006 | Aversenti et al. | 428/364 |

FOREIGN PATENT DOCUMENTS

| DE | 47 829 | 4/1966 |
| DE | 69 06 209 Y | 7/1970 |
| DE | 28 13 707 Y | 2/1979 |
| DE | 33 36 707 Y | 4/1984 |
| DE | 195 25 702 | 1/1997 |
| DE | 101 61 820 | 9/2002 |
| DE | 101 37 785 | 2/2003 |
| DE | 102 04 252 Y | 8/2003 |
| DE | 602 10 267 Y | 8/2006 |
| JP | 11-247861 | 9/1999 |
| JP | 2004-011793 | 1/2004 |
| WO | WO 9951791 A1 * | 10/1999 |

* cited by examiner

Primary Examiner — Thomas R Hannon
Assistant Examiner — Phillip A Johnson
(74) Attorney, Agent, or Firm — Lucas & Mercanti, LLP; Klaus P. Stoffel

(57) ABSTRACT

Disclosed is a rolling bearing component comprising a metallic support with a spray-compacted metal layer which is applied to the metallic support in a spraying process and is provided with the running surface of the rolling bearing.

2 Claims, 3 Drawing Sheets

ROLLING BEARING COMPONENT, AND METHOD FOR THE PRODUCTION THEREOF

This application is a 371 of PCT/EP2007/053541 filed Apr. 12, 2007, which in turn claims the priority of DE 10 2006 023 567.3 filed May 19, 2006, the priority of both applications is hereby claimed and both applications are incorporated by reference herein.

FIELD OF THE INVENTION

The invention relates to a rolling bearing component.

BACKGROUND OF THE INVENTION

Rolling bearings are known to comprise at least two components, specifically an inner race and an outer race, between which the rolling bodies, be they balls or rollers or the like, run. Rotationally symmetrical rolling bearing components of this type are conventionally produced in material-removing fashion and are subsequently case-hardened or carbonitrided in order to improve the rolling fatigue strength. Owing to the stresses which occur, high carburizing depths of more than 2 mm are required, for example, during case-hardening and these cause the duration of the heat treatment to be at least 15-20 hours, depending on the selected material. Further modifications of the surface layer properties are possible only by selecting a different base material which is generally more highly alloyed. The change to a higher-grade base material is, however, associated with greater costs.

SUMMARY OF THE INVENTION

The invention is therefore based on the problem of specifying a rolling bearing component which is simple and inexpensive to produce.

This problem is solved by providing a rolling bearing component comprising a metallic support with a spray-compacted metal layer which is applied to said metallic support by a spraying process and forms the running surface of the rolling bearing.

In contrast to conventional rolling bearing components, the rolling bearing component according to the invention is no longer machined in material-removing fashion from a homogeneous material but from a material composite or a composite material, in which case at least the surface layer forming the running surface of the rolling bearing is produced by a metal spraying process. In the case of a spray-compaction process of this type, in a gas atomizer a steel melt is atomized into spherical droplets in a stream of protective gas. The gas rapidly cools the metal droplets to a temperature between the liquidus temperature and the solidus temperature, frequently even to below the solidus temperature. The droplets cooled in this way move at high speed. They have a pasty consistency. If the droplets then strike a surface, in the present case the support, at high speed, then they are compacted owing to their inherent kinetic energy. This forms a material composite with a high density. The spray compaction makes it possible to produce low-porosity metal layers which are free from segregation and have a homogeneous structure and a high density. These advantages are exploited in the case of the rolling bearing component according to the invention since, according to the invention, as described, the metal layer forming the running surface of the rolling bearing is formed by a spraying process, wherein, following the spraying process, the metal layer only needs to be remachined in order to form the running surface of the rolling bearing.

A series of advantages are associated with using a spraying process for production. This is because there is a high degree of flexibility in terms of the composition of the metal layer and therefore also the setting of the physical, chemical and mechanical properties of the metal layer, since the composition of the metal layer can be varied virtually as desired, particularly in terms of the individual components determining the mechanical, physical and chemical properties. Already appropriate material selection can therefore provide property combinations in the region of the running surface of the rolling bearing which cannot be achieved by the conventional thermochemical treatment processes for carburizing or carbonitriding. The lengthy case-hardening treatment can therefore be omitted. The heat treatment of the rolling bearing component which must always be carried out is therefore dependent only on the component size and therefore the weight, but no longer on the thickness of a surface layer to be modified. Given suitable coordination of support metal and the metal of the applied metal layer (which may also be referred to as the functional layer), residual compressive stresses may also be built up during the heat treatment in analogy to different conversion properties in the case of case-hardened materials. The wear resistance can also be increased significantly compared with conventional solutions by selecting carbide-rich metals for forming the metal layer. The rolling bearing components can also be produced much more quickly, since the formation of the metal layer merely has to be followed by recompaction of the residual porosity in the subsequent production steps such as forging and/or ring rolling, followed by a conventional heat treatment without lengthy diffusion-controlled formation of the running layer of the rolling bearing.

According to a first alternative of the invention, a prefabricated component can be used as the support. This component may be any desired preshaped, preferably near-net-shape blank.

Alternatively, it is also conceivable to produce the support as a spray-compacted component by a spraying process. That is to say that the advantages of the spraying process as have been described above are also exploited for producing the support, with the property requirements which play a role in the selection of the support material being different than those in the selection of the material of the metal layer.

In addition to the rolling bearing component itself, the invention also relates to a method for the production of such a rolling bearing component. This method is distinguished by the fact that a spraying process is used to spray a metal layer onto a metallic support, and said metal layer is subsequently remachined in order to form the running surface of the rolling bearing by conventionally machining the metal layer in a wide variety of machining processes.

In this case, a prefabricated part can be used as the support and, in order to form a close metallic connection between a support and the metal layer, is preferably heated to a temperature close to the solidus temperature of the support metal, only after which process is the metal layer sprayed on. The striking metal droplets which are still molten in the core immediately become bonded to the hot support surface and "alloy on". This ensures a close metallic connection of the two components.

As an alternative to using a prefabricated component, one method variant provides, in a first step, for the support to be produced by a spraying process by spraying the metal which forms the support onto a component holder after which, in a second step, the metal layer is sprayed on. In this case, it is also preferred for the metal layer to be sprayed onto the still-warm support in order to ensure a close material connection.

The production alternatives described above, in which the metal layer is always sprayed onto an existing support, be it in the form of a prefabricated component or a support itself produced by spray compaction beforehand, are primarily used to produce inner races since the tool for carrying out the spraying process is relatively large and cannot be inserted into a support used for producing an outer race. However, in order to also make it possible to produce an outer race with the particularly advantageous spray-compacted metal layer, a further method according to the invention for the production of a rolling bearing component provides, in a first step, for the metal layer to be produced by a spraying process by spraying the metal which forms the metal layer onto a component holder and afterwards, in the second step, for the support to be produced by spraying the support metal onto the metal layer after which, following removal of the component holder, the metal layer is remachined in order to form the running surface of the rolling bearing. In this case, too, it is preferable for the support metal to be sprayed onto the still-warm metal layer.

In the case of this method, the sequence of production is reversed compared to the sequence for the production of an inner race with a spray-compacted support. In this case, the metal layer is firstly sprayed onto the component holder and subsequently forms the inner running surface of the outer race of the rolling bearing. The support is subsequently sprayed on and forms the exterior of the finished outer race component.

BRIEF DESCRIPTION OF THE DRAWINGS

Further advantages, features and details of the invention emerge from the following description of the exemplary embodiments.

DETAILED DESCRIPTION OF THE DRAWINGS

Figure 1:
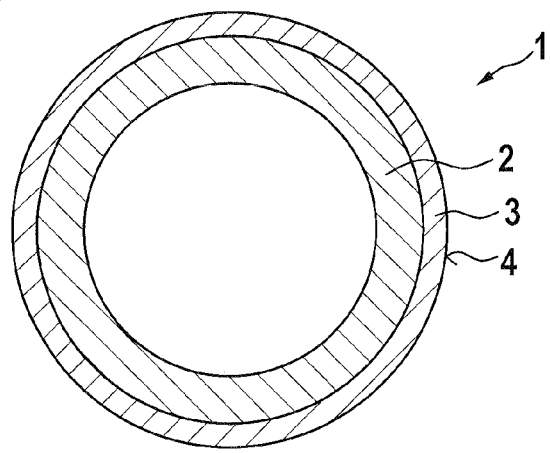
FIG. 1 shows a sectional view through a component according to the invention in the form of an inner race.

FIG. 1 shows a rolling bearing component 1 according to the invention in the form of an inner race comprising a usually hollow-cylindrical support 2 and a metal layer 3 which is applied to said support by a spraying process. In the exemplary embodiment shown, the support 2 is a prefabricated component consisting of metal as is conventionally used for the production of rolling bearing components machined in material-removing fashion. The material of the metal layer 3 can be selected as desired, as long as it is suitable for processing by spray-compaction; high-speed steels or high-temperature steels are preferably suitable for this purpose. In principle, however, any desired composition can be used, that is to say that the conventional steel components such as C, N, Si, Mn, T, S, Cr, Mo, V, Nb, W and Fe as remainder in addition to conventional impurities can, on the one hand, be present in such a quantity that the material can, in principle, be processed by a metal-spraying process and, on the other hand, said components can be selected in such a way that the metal layer produced has the desired physical, chemical and mechanical properties. The wear resistance can in this case also be individually influenced by adding suitable nonmetallic particles such as aluminum oxide or silicon carbide in the form of balls or fibers to the melt. After the metal layer 3 has been formed, it is initially compacted still further in a remachining process, for example by forging or rolling, in order to reduce the pore volume, after which the conventional heat treatment is performed without the special case-hardening, and this is followed by the metal layer 3 being machined to form the outer running surface 4 of the rolling bearing, with it also being possible to carry out this machining prior to the heat treatment.

Figure 2:
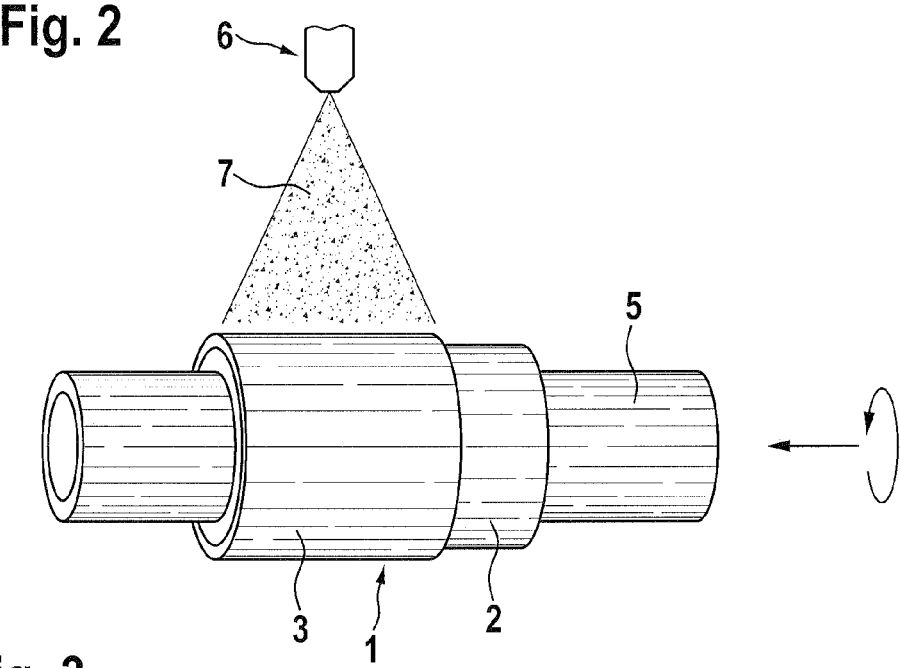
FIG. 2 shows a basic illustration in order to explain the production of the component in FIG. 1.

FIG. 2 shows a basic illustration in order to explain the production of the rolling bearing component 1 in FIG. 1. The prefabricated support 2 forming an integral component of the later rolling bearing component is pushed onto a component holder 5, for example a metal or ceramic tube, and can be held in position, if appropriate, by means of corresponding spacers. The component holder 5 is accommodated in a feed device which is not shown in more detail here and by means of which said holder can be linearly displaced, on the one hand, and also rotated, on the other hand, as illustrated by the two movement arrows. The component holder 5 is moved past a spray device 6, which is not shown in detail here, by means of the feed device. The spray device 6 uses a gas atomizer to spray extremely fine metal droplets 7 of a metal melt in a stream of protective gas onto the support 2 so that the metal layer forms on the support 2 with increasing dwell period as the component holder 5 rotates. The support 2 itself is heated, preferably to a temperature close to its solidus temperature, so that the sprayed-on metal layer 3 adheres optimally to the support 2 in the boundary surface region; this results in alloy formation close to the boundary surface. In the manner described, the entire support 2 is covered by the metal layer 3, after which it is removed from the reusable component holder 5 and remachined.

The component holder is required to accommodate the individual blanks (a multiplicity of individual blanks are normally arranged in succession) or when two layers are sprayed on. If the parts are cut to length from a long tube, only this tube is moved and rotated by means of the feed device for spraying purposes.

Figure 3:
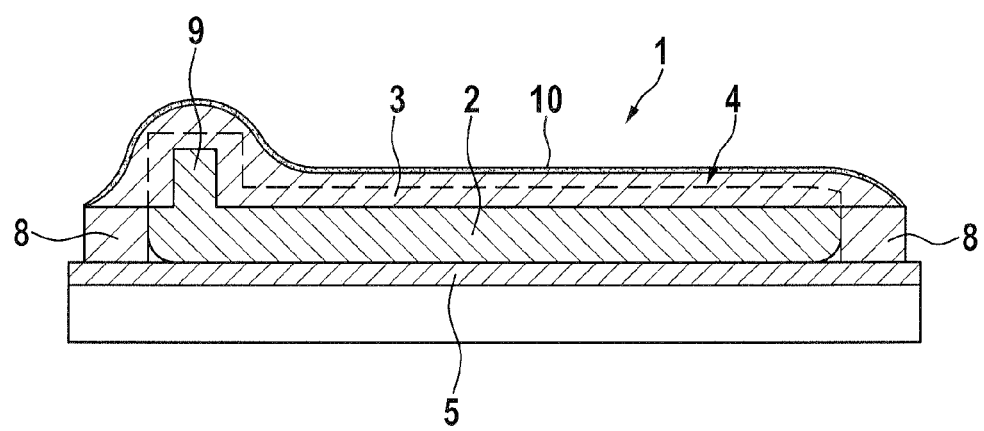
FIG. 3 shows an enlarged longitudinal sectional view through a component according to the invention, similar to that in FIG. 1.

FIG. 3 shows a basic illustration of a longitudinal section through a rolling bearing component 1 produced in this way. The figure shows the component holder 5 on which holding rings 8 are provided or pushed in the example shown. Arranged between said holding rings is the prefabricated support 2 which, in the exemplary embodiment shown, has a radially protruding, integrally formed annular collar 9. The metal layer 3 is sprayed onto the support 2. Said metal layer has an external, porous surface layer 10 which, together with a certain portion of the metal layer 3, is to be removed in material-removing fashion in order to form the raceway 4 of the rolling body. The raceway 4 of the rolling body is shown in dashed lines in FIG. 3.

Figure 4:
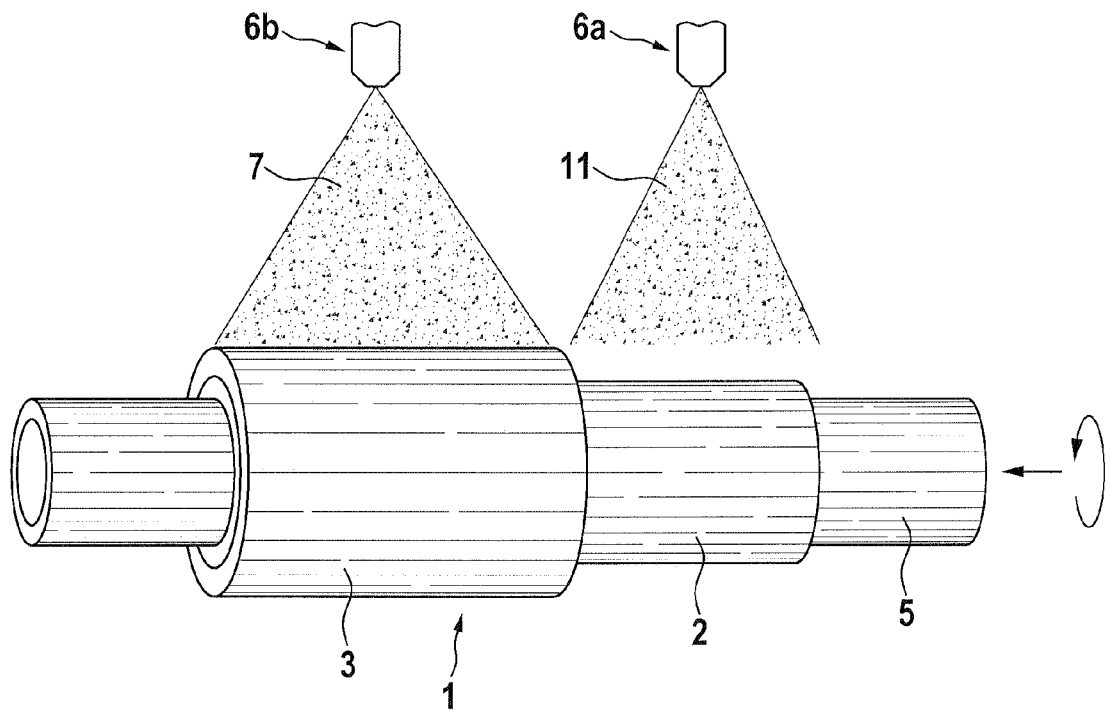
FIG. 4 shows an illustration in order to explain the production of a component according to the invention, in which both the support and the metal layer are produced by a spraying process.

Whereas FIG. 2 shows the production of a rolling bearing component using a prefabricated support, FIG. 4 shows a way of producing both the support 2 and the metal layer 3 by a metal-spraying process. Provision is made of two spray devices 6a and 6b which are disposed one directly after the other. In this case, too, a reusable component holder 5 is. This is likewise moved linearly and simultaneously rotated by means of a feed device (not shown in more detail). In doing so, it is initially conveyed past the spray device 6a. This sprays extremely fine metal droplets 11 of a steel melt, used for producing the support 2, onto the lateral surface of the component holder 5. This forms the support 2 by means of spray compaction. As a result of the feed movement, the support 2, which still contains residual heat owing to the steel melt which has been sprayed on, passes into the operating region of the directly following spray device 6b which sprays on the extremely fine metal droplets 7 for the production of the metal layer 3. Once the support 2 has been covered by the metal layer 3 in the relevant surface region, the spraying process is ended and the rolling bearing component 1 is removed from the component holder 5. This is possible because a porous surface layer, which facilitates the demolding of the component holder 5, is formed in the boundary surface region between the component holder 5 and the sprayed-on support 2. The porous surface layer on the internal diameter of the support is subsequently to be removed by material-removing machining. By controlling the overlap of the spray cones, this process also permits property gradients of differing steepness to be set between the support 2 and the metal layer 3.

Figure 5:
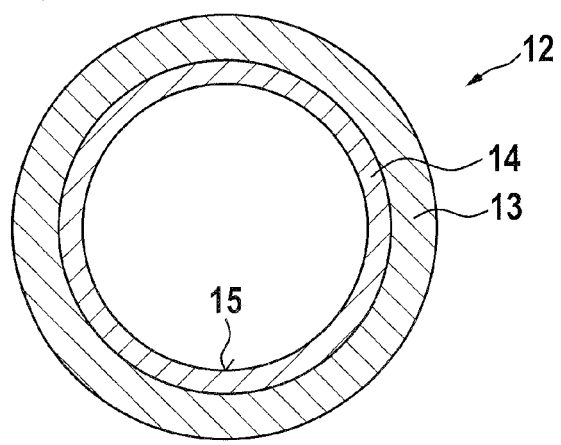
FIG. 5 shows a sectional view through a further component according to the invention in the form of an outer race.

FIG. 5 shows a further rolling bearing component 12 according to the invention, in this case in the form of an outer race, having a support 13 which forms the exterior of the component and on the internal diameter of which is provided a metal layer 14 of which the inner surface forms the running surface 15 of the rolling bearing. A rolling bearing component 12 of this type having an inner metal layer is likewise produced by a process in which both the support 13 and the metal layer 14 are sprayed on using the corresponding steel melts.

Figure 6:
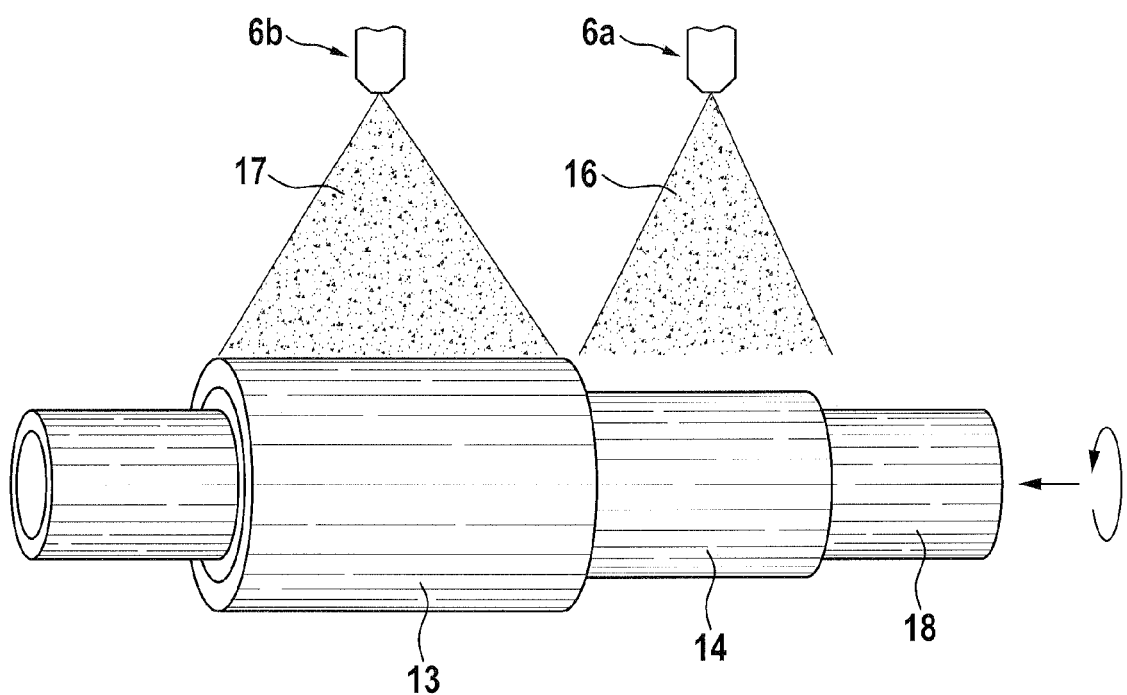
FIG. 6 shows a basic illustration in order to explain the production of the component in FIG. 5.

FIG. 6 shows the procedure of the method in the form of a basic illustration. In this case, too, a reusable component holder 18 is used and two spray devices 6a and 6b are likewise provided. By means of the feed device (not shown in more detail), the component holder 18 is initially guided past the spray device 6a which, in this case, sprays on extremely fine metal droplets 16; however, in this case, this is the metal required to form the metal layer 14 directly on the surface of the component holder 18. In this case, too, a porous surface layer, similar to that illustrated in FIG. 3, is formed in the boundary surface region between the metal layer 14 and the surface of the component support 18; however, said surface layer is removed in material-removing fashion together with a certain portion of the metal layer in order to form the running surface 15 of the rolling body.

During the further linear movement of the component holder 18, the sprayed-on metal layer 14 passes into the operating region of the spray device 6b, which sprays extremely fine metal droplets 17 of the steel melt onto the still-hot outer surface of the metal layer 14 in order to form the support 13. In this case, too, the residual heat of the metal layer 14 means that heating is not required. Here, too, a close metallic connection between the metal of the metal layer 14 and that of the support 13 ensues.

Here, too, the demolding of the component holder 18 is followed by the appropriate remachining, on the one hand for removing the porous surface layer of the metal layer 14 for machining out the running surface 15 of the rolling body, on the other hand on the outside the removal of the porous surface layer of the support 13 and the corresponding mechanical forging or rolling treatment for reducing the pore volume, followed by the temperature treatment already described.

Finally, it should yet be pointed out that the thickness of the metal layer and the thickness of the prefabricated support or rather the thickness of the support produced by spray compaction can be arbitrary; they are preferably within a similar thickness range. By way of example, the thickness of the support for an inner race for accommodating a shaft having a diameter of 100 mm can be approximately 10 mm, whereas the thickness of the metal layer can be approximately 6-8 mm. The thicknesses of a corresponding outer race which terminates the rolling bearing are within similar ranges. The thicknesses vary depending on the size of the diameter of the respective rolling bearing component.

LIST OF REFERENCE NUMERALS

1 Rolling bearing component
2 Support
3 Metal layer
4 Running surface of the rolling bearing
5 Component holder
6 Spray device
6a Spray device
6b Spray device
7 Metal droplets
8 Holding ring
9 Annular collar
10 Surface layer
11 Metal droplets
12 Rolling bearing component
13 Support
14 Metal layer
15 Running surface of the rolling bearing
16 Component holder
17 Metal droplets
18 Component holder

The invention claimed is:

1. A method for producing a rolling bearing component, which comprises a metallic support, which is a spray-compacted component produced by a spraying process and a spray-compacted metal layer that is applied to the metallic support by the spraying process to form a running surface for the rolling bearing, the method comprising the following sequential steps:
    spraying a metal, which forms the metal layer, onto a component holder so as to produce the metal layer by the spraying process; then
    spraying a support metal onto the metal layer so as to produce the metallic support; and then
    re-machining the metal layer, following a removal of the component holder, to form the running surface of the rolling bearing.

2. The method as claimed in claim 1, wherein the support metal is sprayed onto metal layer, which is still warm.

* * * * *